United States Patent
Cho et al.

(10) Patent No.: US 12,466,265 B2
(45) Date of Patent: Nov. 11, 2025

(54) APPARATUS FOR CONTROLLING DIAGNOSTIC OF A BATTERY PACK, BATTERY SYSTEM HAVING THE SAME AND METHOD THEREOF

(71) Applicants: Hyundai Motor Company, Seoul (KR); Kia Corporation, Seoul (KR)

(72) Inventors: Hyun Ki Cho, Anyang-Si (KR); Yoon Cheol Jeon, Suwon-Si (KR); Jin Soo Jang, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 279 days.

(21) Appl. No.: 18/133,659

(22) Filed: Apr. 12, 2023

(65) Prior Publication Data
US 2024/0157799 A1 May 16, 2024

(30) Foreign Application Priority Data
Nov. 15, 2022 (KR) .................. 10-2022-0152869

(51) Int. Cl.
*B60L 3/00* (2019.01)
*B60L 3/04* (2006.01)
(Continued)

(52) U.S. Cl.
CPC ............. *B60L 3/04* (2013.01); *B60L 3/0046* (2013.01); *B60L 58/16* (2019.02); *B60W 10/08* (2013.01);
(Continued)

(58) Field of Classification Search
CPC .......... B64C 13/02; B64D 2045/0085; B64D 27/24; B64D 31/02; G01R 1/206;
(Continued)

(56) References Cited

U.S. PATENT DOCUMENTS

| | | |
|---|---|---|
| 2020/0122583 A1 | 4/2020 | Harvey |
| 2020/0274368 A1 | 8/2020 | Crouse, Jr. |
| 2020/0274371 A1 * | 8/2020 | Kirleis ................. B64D 27/24 |

FOREIGN PATENT DOCUMENTS

| | | | |
|---|---|---|---|
| CN | 105576747 A | 5/2016 | |
| CN | 112039156 A * | 12/2020 | ............. B64D 45/00 |

(Continued)

OTHER PUBLICATIONS

Apr. 23, 2024—(EP) Extended European Search Report—App 23210076.8.

Primary Examiner — Charles J Han
(74) Attorney, Agent, or Firm — Banner & Witcoff, Ltd.

(57) ABSTRACT

The present disclosure relates to a battery pack diagnosis control apparatus, a battery system including the same, and a method thereof. An exemplary embodiment of the present disclosure provides a battery system including: at least one battery pack; a flight control apparatus configured to transmit at least one of a battery discharge mode command or a motor discharge command; a battery control apparatus configured to transmit a relay control command for a relay based on receiving the battery discharge mode command, and transmit a diagnosis command based on receiving the motor discharge command; and at least one battery pack control apparatus configured to control the relay based on receiving the relay control command, and diagnose a failure of the at least one battery pack by measuring a current of the at least one battery pack based on receiving the diagnosis command.

16 Claims, 13 Drawing Sheets

(51) Int. Cl.
  *B60L 58/16* (2019.01)
  *B60W 10/08* (2006.01)
(52) U.S. Cl.
  CPC ..... *B60L 2200/10* (2013.01); *B60L 2240/549* (2013.01)
(58) Field of Classification Search
  CPC .......... G01R 19/16571; G01R 19/1659; G01R 31/008; G01R 31/3274; G01R 31/3275; G01R 31/3646; G01R 31/3648; G01R 31/367; G01R 31/371; G01R 31/3842; G01R 31/388; G01R 31/389; G01R 31/392; G01R 31/396
  See application file for complete search history.

(56) References Cited

FOREIGN PATENT DOCUMENTS

| | | |
|---|---|---|
| JP | 2012-138278 A | 7/2012 |
| JP | 2022-063228 A | 4/2022 |
| KR | 10-2021-0034266 A | 3/2021 |
| KR | 10-2021-0080070 A | 6/2021 |
| KR | 10-2022-0030086 A | 3/2022 |
| KR | 10-2022-0111784 A | 8/2022 |

\* cited by examiner

APPARATUS FOR CONTROLLING DIAGNOSTIC OF A BATTERY PACK, BATTERY SYSTEM HAVING THE SAME AND METHOD THEREOF

CROSS-REFERENCE TO RELATED APPLICATION

This application claims priority to and the benefit of Korean Patent Application No. 10-2022-0152869, filed in the Korean Intellectual Property Office on Nov. 15, 2022, the entire contents of which are incorporated herein by reference.

BACKGROUND

(a) Field

The present disclosure relates to a battery pack diagnosis control apparatus, a battery system including the same, and a method thereof, and more particularly, to a technique for determining whether a parallel battery pack of an aircraft is abnormal.

(b) Description of the Related Art

A flying vehicle may be an aircraft capable of transporting occupants, including pilots and passengers, onboard and flying (and/or driving) autonomously or semi-autonomously, or an aircraft that is capable of flying autonomously (e.g., unmanned) by external control or a program without any occupants onboard. Accordingly, such an autonomous flying object may be used in various fields such as visiting and investigating areas where it is difficult for humans to fly directly to perform missions, meteorological observation, planetary exploration, aerial photography, etc.

The flying object may mainly use a parallel (e.g., backup) battery pack system to maintain a minimum output for safe flight even when some batteries fail. During an initial operation of such a parallel battery pack system, it may be necessary to accurately determine whether relays of all battery packs connected in parallel are open or closed for safe flight.

Conventionally, whether a relay of a single battery pack is opened or closed was determined based on a voltage difference between the battery pack and a direct current (DC) link voltage.

However, due to connection characteristics of a parallel (e.g., backup) battery pack, even when one battery pack is connected, a DC link voltage may be charged, thus it may be difficult to diagnose whether a relay of another battery pack is opened or closed by comparing a difference between a voltage of the battery pack and the DC link voltage.

The above information disclosed in this Background section is only for enhancement of understanding of the background of the disclosure, and therefore, it does not form the prior art that is already known in this country to a person of ordinary skill in the art.

SUMMARY

Example embodiments of the present disclosure have been made in an effort to provide a battery pack diagnosis control apparatus, a battery system including the same, and a method thereof, capable of determining whether a parallel battery pack mounted in a flying object fails by accurately diagnosing whether a relay of a diagnosis circuit of the parallel battery pack is opened or closed through a current diagnosis method of the parallel battery pack.

The technical objects of the present disclosure are not limited to the objects mentioned above, and other technical objects not mentioned may be clearly understood by those skilled in the art from the description of the claims.

In one or more example embodiments, a battery system may include at least one battery pack, and a flight control apparatus configured to transmit at least one of a battery discharge mode command or a motor discharge command. The battery system may further include a battery control apparatus configured to transmit a relay control command for a relay based on receiving the battery discharge mode command, and transmit a diagnosis command based on receiving the motor discharge command. The battery system may further include at least one battery pack diagnosis control apparatus configured to control the relay based on receiving the relay control command, and diagnose a failure of the at least one battery pack by measuring a current of the at least one battery pack based on receiving the diagnosis command.

The battery system may further include at least one diagnosis circuit, connected to the at least one battery pack, comprising the relay.

The at least one battery pack diagnosis control apparatus may be further configured to measure the current flowing from the at least one battery pack to the at least one diagnosis circuit, and determine whether the measured current exceeds a predetermined threshold value to diagnose whether the at least one battery pack is out of order.

The at least one battery pack diagnosis control apparatus may be further configured to determine that the at least one battery pack is in a faulty state and notify the flight control apparatus of the faulty state based on the measured current not exceeding the predetermined threshold value.

The at least one battery pack diagnosis control apparatus may be further configured to control the relay for a second time based on the measured current not exceeding the predetermined threshold value.

The motor discharge command may include a motor discharge start signal. The battery control apparatus may be further configured to transmit the diagnosis command based on detecting a rising edge of the motor discharge start signal received from the flight control apparatus.

The battery system may further include a ground control apparatus configured to, based on receiving a notification of a battery pack failure state from the flight control apparatus, output the notification.

The at least one battery pack diagnosis control apparatus may be further configured to transmit a relay control result to the flight control apparatus via the battery control apparatus after the at least one battery pack diagnosis control apparatus controls the relay.

The flight control apparatus may be configured to transmit the motor discharge command based on receiving a relay control result.

The at least one diagnosis circuit may include a current sensor connected to an anode (+) terminal of a first battery pack of the at least one battery pack to measure a current flowing from the first battery pack, and a first main relay and a second main relay that are opened and closed under control of a first battery pack diagnosis control apparatus of the at least one battery pack diagnosis control apparatus.

The first battery pack diagnosis control apparatus may be configured to diagnose whether the first battery pack is out of order by using the current measured by the current sensor. The current may be measured by the current sensor after the first main relay and the second main relay are closed by the first battery pack diagnosis control apparatus.

The current sensor may be a first current sensor. The at least one diagnosis circuit may further include: a second current sensor connected to an anode (+) terminal of a second battery pack of the at least one battery pack to measure a current flowing from the second battery pack, and a third main relay and a fourth main relay that are opened and closed under control of a second battery pack diagnosis control apparatus of the at least one battery pack diagnosis control apparatus. The first main relay and the third main relay may be connected to each other. The second main relay and the fourth main relay may be connected to each other.

According to one or more example embodiments, a battery pack diagnosis control apparatus may include: one or more processors; and memory storing instructions that, when executed by the one or more processors, cause the battery pack diagnosis control apparatus to diagnose whether a battery pack is out of order by: controlling a relay, of a diagnosis circuit connected to the battery pack, in a battery discharge mode; and measuring a current flowing from the battery pack to the diagnosis circuit after starting motor discharge.

The instructions, when executed by the one or more processors, may further cause the battery pack diagnosis control apparatus to determine that the battery pack is in a faulty state based on the measured current not exceeding a predetermined threshold value.

The instructions, when executed by the one or more processors, may cause the battery pack diagnosis control apparatus to control the relay for a second time based on the measured current not exceeding the predetermined threshold value.

According to one or more example embodiments, a method may include: controlling, by a processor, a relay of a diagnosis circuit in a battery pack diagnosis control apparatus; and diagnosing, by the processor, whether a battery pack is out of order by measuring a current flowing from the battery pack to the diagnosis circuit after the battery pack diagnosis control apparatus starts motor discharge. The diagnosis circuit may be connected to the battery pack in a battery discharge mode.

The method may further include receiving, from a battery control apparatus, a control command for the relay based on the battery control apparatus receiving a battery discharge mode command from a flight control apparatus; and receiving, from the battery control apparatus, a diagnosis command based on the battery control apparatus receiving a motor discharge command from the flight control apparatus.

Diagnosing of whether the battery pack is out of order may include: determining, by the processor, that the battery pack is in a failure state based on the measured current not exceeding a predetermined threshold value; and notifying, by the processor, the flight control apparatus of the failure state via the battery control apparatus.

Diagnosing of whether the battery pack is out of order may include: controlling the relay for a second time based on the measured current not exceeding a predetermined threshold value.

Diagnosing whether the battery pack is out of order may include: determining that the battery pack is in a normal state; and completing flight preparation based on the measured current exceeding a predetermined threshold value.

According to the present technique, it may be possible to determine whether a parallel battery pack mounted in a flying object fails by accurately diagnosing whether a relay of a diagnosis circuit of the parallel battery pack is opened or closed through a current diagnosis method of the parallel battery pack.

Furthermore, various effects that can be directly or indirectly identified through this document may be provided.

DETAILED DESCRIPTION

Figure 1:
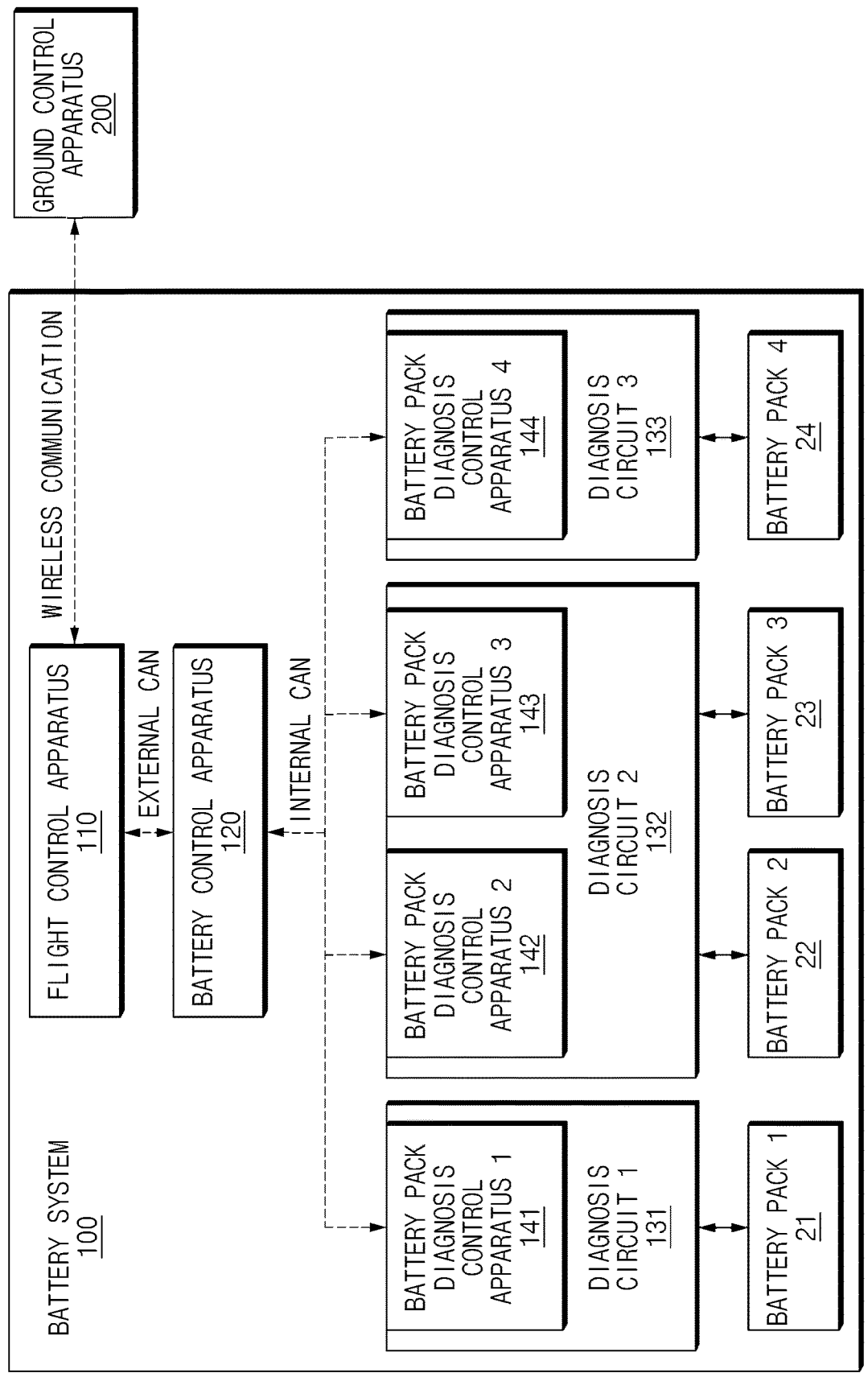
FIG. 1 illustrates a schematic diagram showing an example battery system.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 12.

Figure 2:
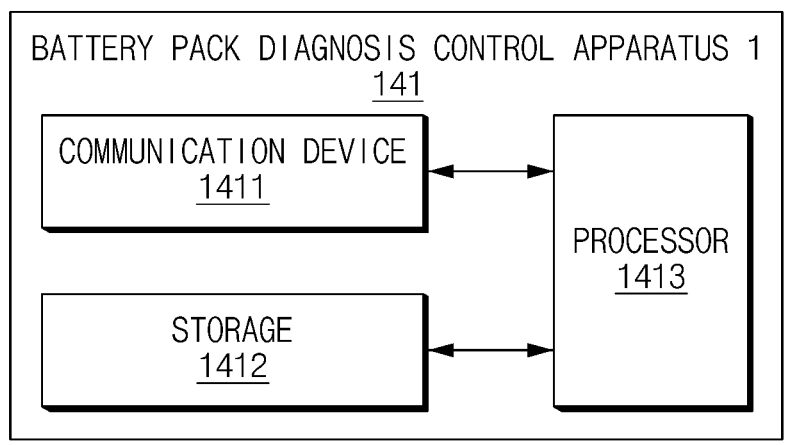
FIG. 2 illustrates a detailed schematic diagram of an example battery pack diagnosis control apparatus.
Figure 3A:
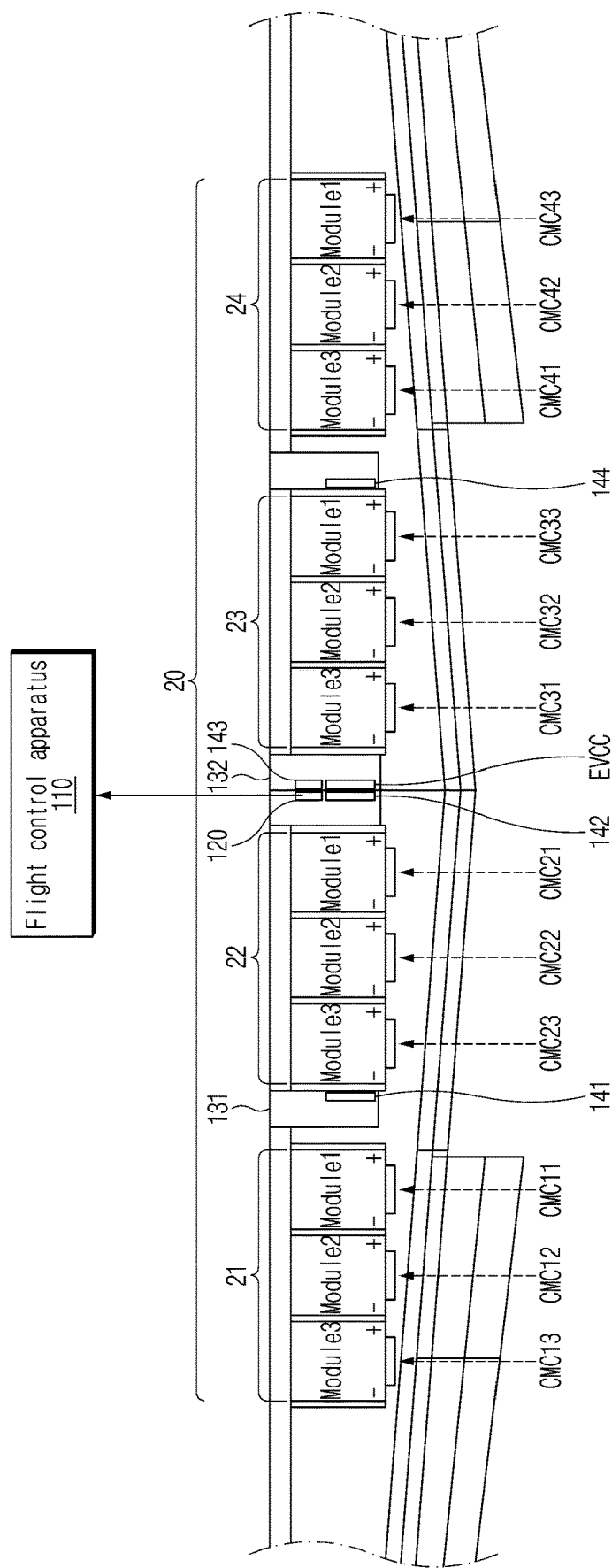
FIG. 3A illustrates a configuration diagram of an example parallel battery pack of a flying object.

FIG. 1 illustrates a schematic diagram showing an example battery system, and FIG. 2 illustrates a detailed schematic diagram of an example battery pack diagnosis control apparatus. FIG. 3A illustrates a configuration diagram of an example parallel battery pack of a flying object, and FIG. 3B illustrates an example parallel battery pack mounted in a flying object.

Figure 3B:
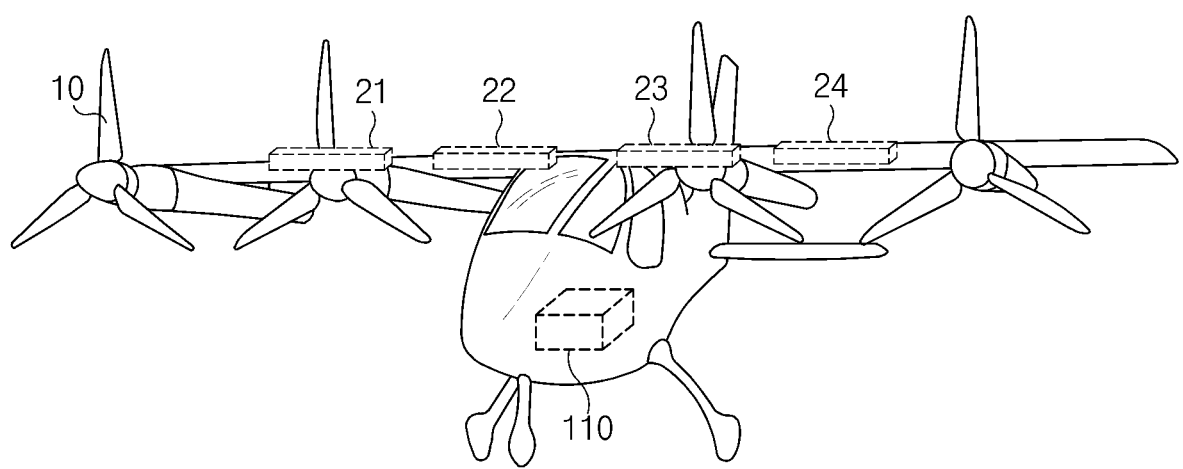
FIG. 3B illustrates an example parallel battery pack mounted in a flying object.

The battery system 100 of FIG. 1 may be mounted in the flying object 10 as illustrated in FIG. 3A and FIG. 3B.

The flying object 10 may include a first kind of air mobility vehicle that has occupants, including pilots and/or passengers, onboard and may fly autonomously or semi-autonomously, and a second kind of air mobility vehicle that may fly autonomously by external control or program without occupants onboard. Specifically, the flying object 10 may include a helicopter, a drone, an airplane, or a vehicle that moves with wheels on the ground and can fly when it goes up in the air, and as mentioned earlier, these may include both manned and unmanned vehicles.

The battery system 100 according to an exemplary embodiment of the present disclosure may be implemented inside or outside the flying object. In this case, the battery system 100 may be integrally formed with internal control units of the flying object, or may be implemented as a separate hardware device to be connected to control units of the flying object by a connection means. For example, the battery system 100 may be implemented integrally with the flying object, may be implemented in a form that is installed or attached to the flying object as a configuration separate from the flying object, or a part thereof may be implemented integrally with the vehicle, and another part may be implemented in a form that is installed or attached to the flying object as a configuration separate from the flying object.

The battery system 100 may determine whether battery packs 21, 22, 23, and 24 are abnormal (e.g., out of order, in a failure state, etc.) by diagnosing, before or after flight, whether relays of the diagnosis circuits 131, 132, and 133 connected to the battery packs 21, 22, 23, and 24 connected in parallel are opened or closed.

Referring to FIG. 1, the battery system 100 may include a flight control apparatus 110, a battery control apparatus 120, battery pack diagnosis control apparatuses 141, 142, 143, 144, the diagnosis circuits 131, 132, and 133, and the battery pack 21, 22, 23, and 24.

In this case, the flight control apparatus 110 may perform external controller area network (CAN) communication with the battery control apparatus 120, and the battery control apparatus 120 may perform internal CAN communication with the battery pack diagnosis control apparatuses 141, 142, 143, and 144.

The flight control apparatus 110 may determine whether a battery pack is out of order based on a battery pack relay opening/closing diagnosis result received from the battery control apparatus 120 to transmit the result to a ground control apparatus 200.

The flight control apparatus 110 may transmit a battery discharge mode command or a motor discharge command (e.g., a motor discharge start signal) to the battery control apparatus 120. The flight control apparatus 110 may transmit the motor discharge start signal to the battery control apparatus 120 if a relay control result is received from the battery control apparatus 120.

If a battery pack fails, the flight control apparatus 110 may notify the ground control device 200 of a failure state thereof upon receiving a diagnosis result of the battery pack from the battery control apparatus 120.

Figure 4:
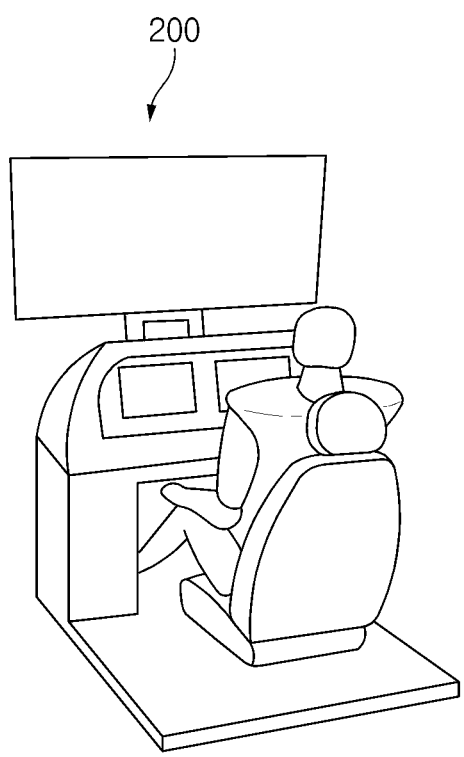
FIG. 4 illustrates an example ground control device.

The flight control apparatus 110 may perform wireless communication with the ground control apparatus 200 as illustrated in FIG. 4. In this case, the ground control apparatus 200 may output battery pack failure state information that was received from the flight control apparatus 110 and create a same or similar control environment as that of the flying object.

To this end, the flight control apparatus 110 may communicate with not only the ground control apparatus 200 but also external servers, infrastructure, and other flying objects through wireless communication techniques. Herein, the wireless communication techniques may include very high frequency (VHF) communication, high frequency (HF) communication, satellite communication system (SATCOM), etc.

The battery control apparatus 120 may control whether the relays of the diagnosis circuits 131, 132, and 133 are opened or closed, and transmit a diagnostic command, to the battery pack diagnosis control apparatus 141, 142, 143, 144, for diagnosing whether a relay of the battery pack is opened or closed. The battery control apparatus 120 may receive, from the battery pack diagnosis control apparatuses 141, 142, 143, and 144, a diagnosis result of whether the relay of the battery pack is opened or closed, and transmit the diagnosis result to the flight control apparatus 110.

The battery control apparatus 120 may transmit a diagnostic command to the battery pack diagnosis control apparatuses 141, 142, 143, and 144 if the battery control apparatus 120 detects a rising edge of the motor discharge start signal that is received, from the flight control device 110, for motor discharge.

The battery pack diagnosis control apparatuses 141, 142, 143, and 144 may diagnose whether the relay is opened or closed by measuring a current flowing in the diagnosis circuits 131, 132, and 133 connected to the battery packs 21, 22, 23, and 24.

Referring to FIG. 2, the first battery pack diagnosis control apparatus 141 may include a communication device 1411, a storage 1412, and a processor 1413. Other battery pack diagnosis control apparatuses 142, 142, and 144 may have the same or similar structures as the first battery pack diagnosis control apparatus 141.

The communication device 1411 may be a hardware device implemented with various electronic circuits to transmit and receive signals through a wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 1411 may receive a command signal from the battery control apparatus 120, and may transmit signals for controlling internal elements of the diagnosis circuits 131, 132, and 133.

The storage 1412 may store data and/or algorithms required for the processor 1413 to operate, and the like. As an example, the storage 1412 may pre-store a threshold value for comparison with a current value measured by diagnosing whether the relay is opened or closed.

The storage 1412 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 1413 may be electrically connected to the communication device 1411, the storage 1412, and the like, may electrically control each component, and may be an electrical circuit that executes software commands, thereby performing various data processing and calculations described below.

The processor 1413 may perform overall control such that each component can normally perform their functions by processing a signal transferred between each component of the first battery pack diagnosis control apparatus 141. The processor 1413 may be implemented in the form of hardware, software, or a combination of hardware and software. For example, the processor 1413 may be implemented as a microprocessor, but the present disclosure is not limited thereto.

The processor 1413 may measure the current flowing from at least one of the battery pack 21, 22, 23, and 24 to at least one of the respective diagnosis circuit 131, 132, 133, and 134, and may determine whether a measured current value exceeds a predetermined threshold value, to diagnose whether one or more battery packs 21, 22, 23, and/or 24 are out of order.

If the measured current value does not exceed the predetermined threshold value, the processor 1413 may determine that the battery packs 21, 22, 23, and 24 are in a failure state, and transmit a determination result thereof to the battery control apparatus 120. Accordingly, the battery control apparatus 120 may notify the flight control apparatus 110 of the failure state of the battery pack(s).

The processor 1413 may perform relay control again (e.g., for a second time) if the measured current value does not exceed the predetermined threshold value.

Although only the first battery pack diagnosis control apparatuses 141 is illustrated in FIG. 2, a detailed configuration of the battery pack diagnosis control apparatuses 142, 143, and 144 may be the same as that of FIG. 2. The diagnosis circuits 131, 132, and 133 may be connected to the battery packs 21, 22, 23, and 24 to open and close relays. A detailed circuit will be described later with reference to FIG. 7 and FIG. 8.

A plurality of battery packs 21, 22, 23 and 24 may be connected in parallel.

Referring to FIG. 3A, the battery packs 21, 22, 23, and 24 may each include a first battery module, a second battery module, and a third battery module. However, the battery packs 21, 22, 23, and 24 may include fewer than or more than three battery modules.

The battery system 100 may further include a cell module controller (CMC) and an electric vehicle communication controller (EVCC) in addition to the configuration of FIG. 1. The CMC may perform battery cell management, such as measurement of cell voltages and cell temperatures. The CMC may include CMC11, CMC12, CMC13, CMC 21, . . . . and CMC43 provided for each battery module of the battery packs 21, 22, 23, and 24. The EVCC may be provided in the second diagnosis circuit 132, and may communicate with an external charger.

The battery packs 21, 22, 23, and 24 may be provided as high voltage batteries connected in parallel, and may be provided in wings of the flying object 10 as illustrated in FIG. 3B.

Figure 5:
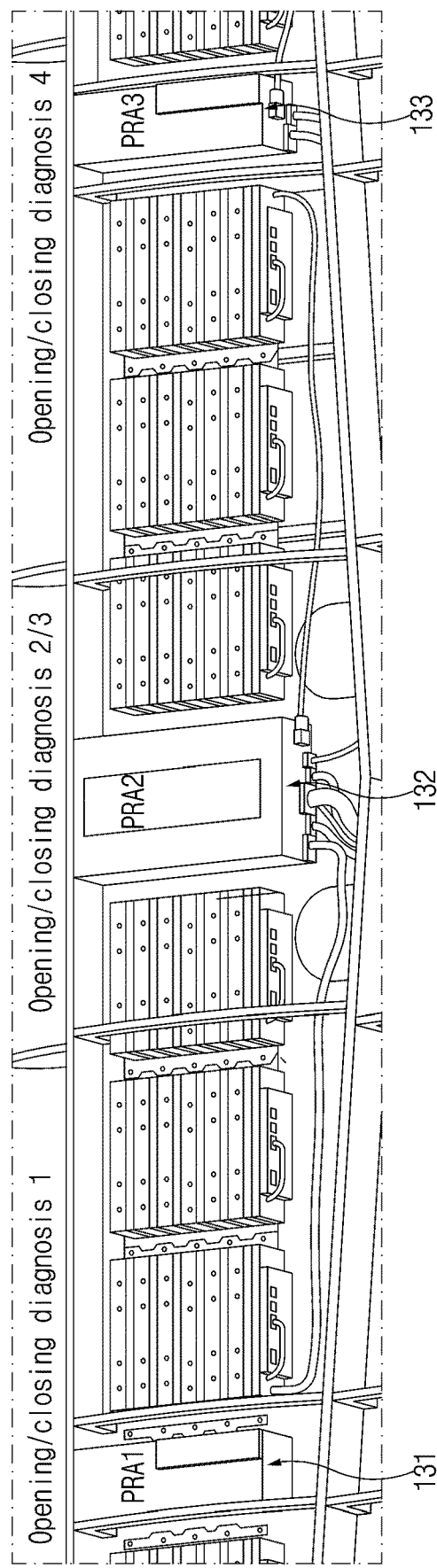
FIG. 5 illustrates a view of an example parallel battery pack and an opening/closing diagnosis position.

FIG. 5 illustrates a view of an example parallel battery pack and an opening/closing diagnosis position. The battery packs provided in the flying object may be provided in parallel as high voltage battery packs.

Referring to FIG. 5, the first diagnosis circuit 131 (PRA1), the second diagnosis circuit 132 (PRA2), and the third diagnosis circuit 133 (PRA3) may be provided between the battery packs connected in parallel, each of the diagnosis circuits 131, 132, and 133 may be provided with a relay, and for safe initial driving flight, it may be necessary to accurately determine whether the relay of each of the diagnosis circuit 131, 132, and 133 connected to all the battery packs is opened or closed.

Figure 6:
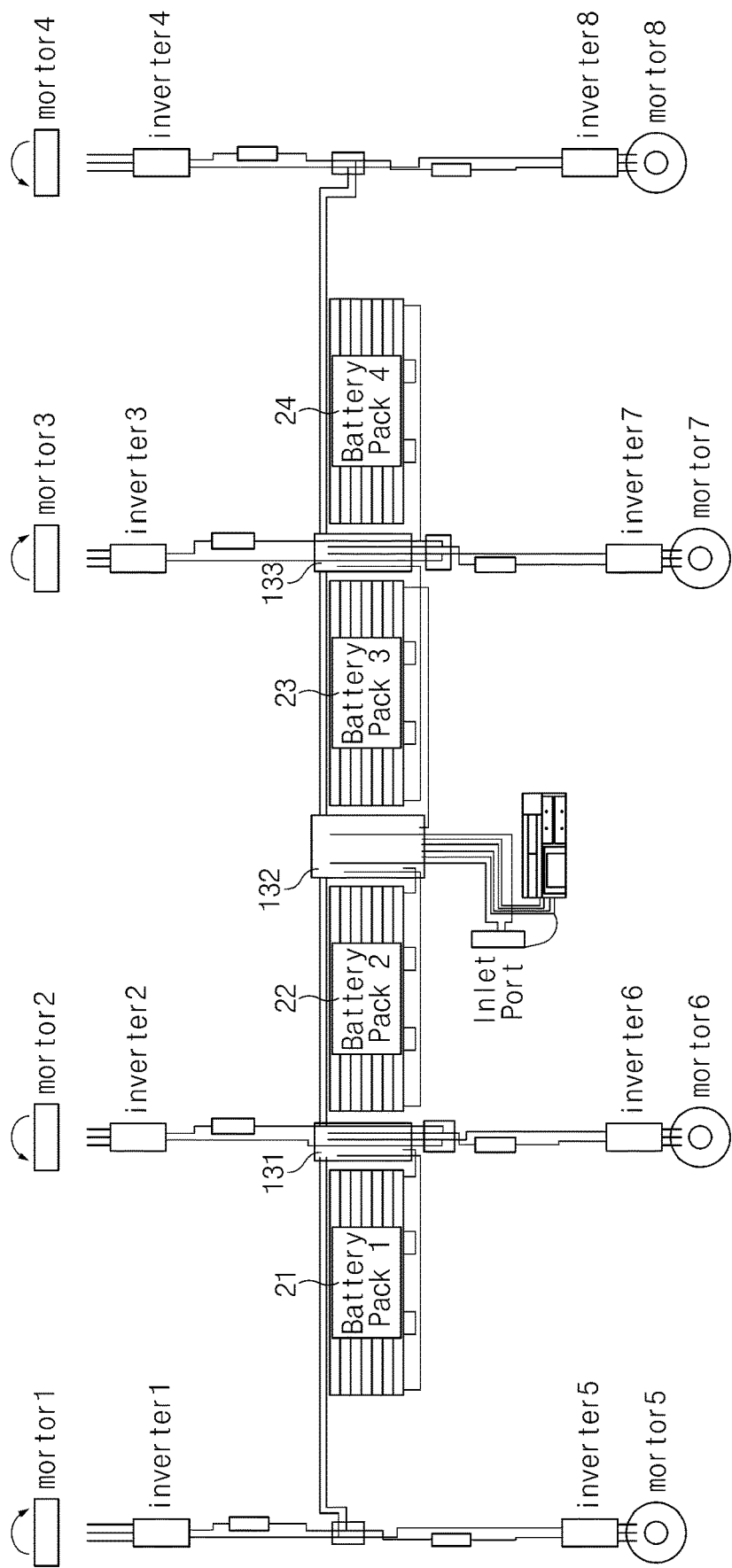
FIG. 6 illustrates a configuration of example high voltage parallel batteries.

FIG. 6 illustrates a configuration of example high voltage parallel batteries.

Referring to FIG. 6, a first motor, a first inverter, a fifth inverter, and a fifth motor may be connected in series. A second motor, a second inverter, a sixth inverter 6, and a sixth motor may be connected in series. A third motor, a third inverter, a seventh inverter, and a seventh motor 7 may be connected in series. A fourth motor, a fourth inverter, an eighth inverter, and an eighth motor may be connected in series. The diagnosis circuit 131 may be provided between the second and sixth inverters, and a diagnosis circuit 133 may be provided between the third and seventh inverters.

The diagnosis circuit 131 may be provided in the first battery pack 21, the diagnosis circuit 132 may be provided between the second battery pack 22 and the third battery pack 23, and the diagnosis circuit 1330 may be provided in the fourth battery pack 24. The diagnosis circuit 131 may diagnose whether the relay of the first battery pack 21 is opened or closed, the second diagnosis circuit 132 may diagnose whether the relays of the second battery pack 22 and the third battery pack 23 are opened or closed, and the diagnosis circuit 133 may diagnose whether the relay of the fourth battery pack 24 is opened or closed.

Figure 7:
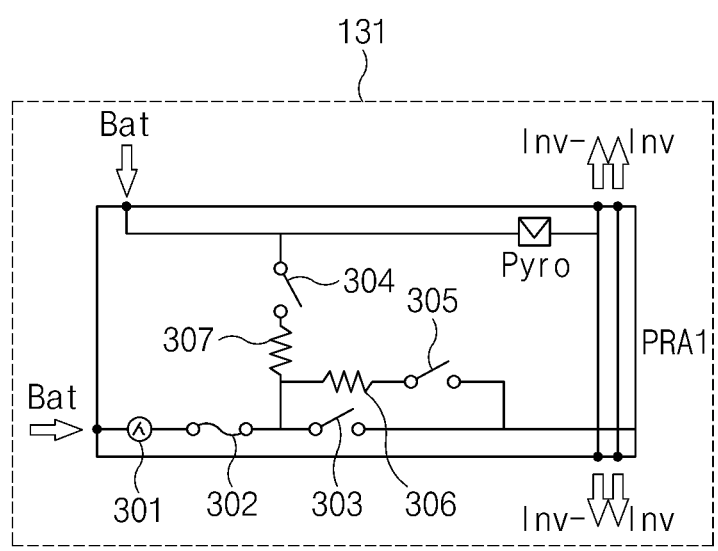
FIG. 7 illustrates a detailed circuit diagram of an example first diagnosis circuit.

FIG. 7 illustrates a detailed circuit diagram of an example first diagnosis circuit 131. However, other diagnosis circuits, such as diagnosis circuits 132 and 133 may have the same or similar structure as the first diagnosis circuit 131.

Referring to FIG. 7, the diagnosis circuit 131 may include a current sensor 301, a fuse 302, a main relay 303, a main relay 304, a precharge relay 305, a precharge resistor 306, and a resistor 307. The main relay 303 and the main relay 304 may be switching devices, and the precharge relay 305 may determine whether or not to transmit a current to the outside of the diagnosis circuit. The precharge relay 305 may be first closed at a moment when (or after) discharging of the motor starts, so that precharging is performed by synchronizing a battery pack voltage and a DC link voltage. Subsequently, if no current inrush occurs, the main relays 303 and 304 may be closed.

Opposite ends of the first diagnosis circuit 131 may be connected to the first battery pack 21, and the main relays 303 and 304 may be opened or closed under the control of the first battery pack diagnosis control apparatus 141. A first side of the current sensor 301 may be connected to a first side of the first battery pack 21, and a second side of the current sensor 301 may be connected to a first side of the fuse 302. The main relay 303 and the precharge relay 305 may be connected in parallel, and the precharge resistor 306 may be connected in series with the precharge relay 305. A first side of the main relay 304 may be connected to a second side of the first battery pack 21, a first side of the resistor 307 may be connected in series with the main relay 304, and a second side of the resistor 307 may be connected to a second side of the fuse 302. Accordingly, after the main relays 303 and 304 and the precharge relay 305 are closed, a current caused by the first battery pack 21 may flow.

A current flowing from an anode (+) terminal of the battery pack may flow through the current sensor 301 and the fuse 302, and may flow in a direction of the main relay 303 and a direction of the resistor 307 and the main relay 304. In this case, if the main relay 304 is opened, no current may flow. In addition, if one of the parallel connected main relay 303 or precharge relay 305 is opened, no current may flow.

In this case, since a detailed circuit of the diagnosis circuit 131 is the same as that of the diagnosis circuit 133, a description of a detailed circuit of the diagnosis circuit 133 will be omitted.

Figure 8:
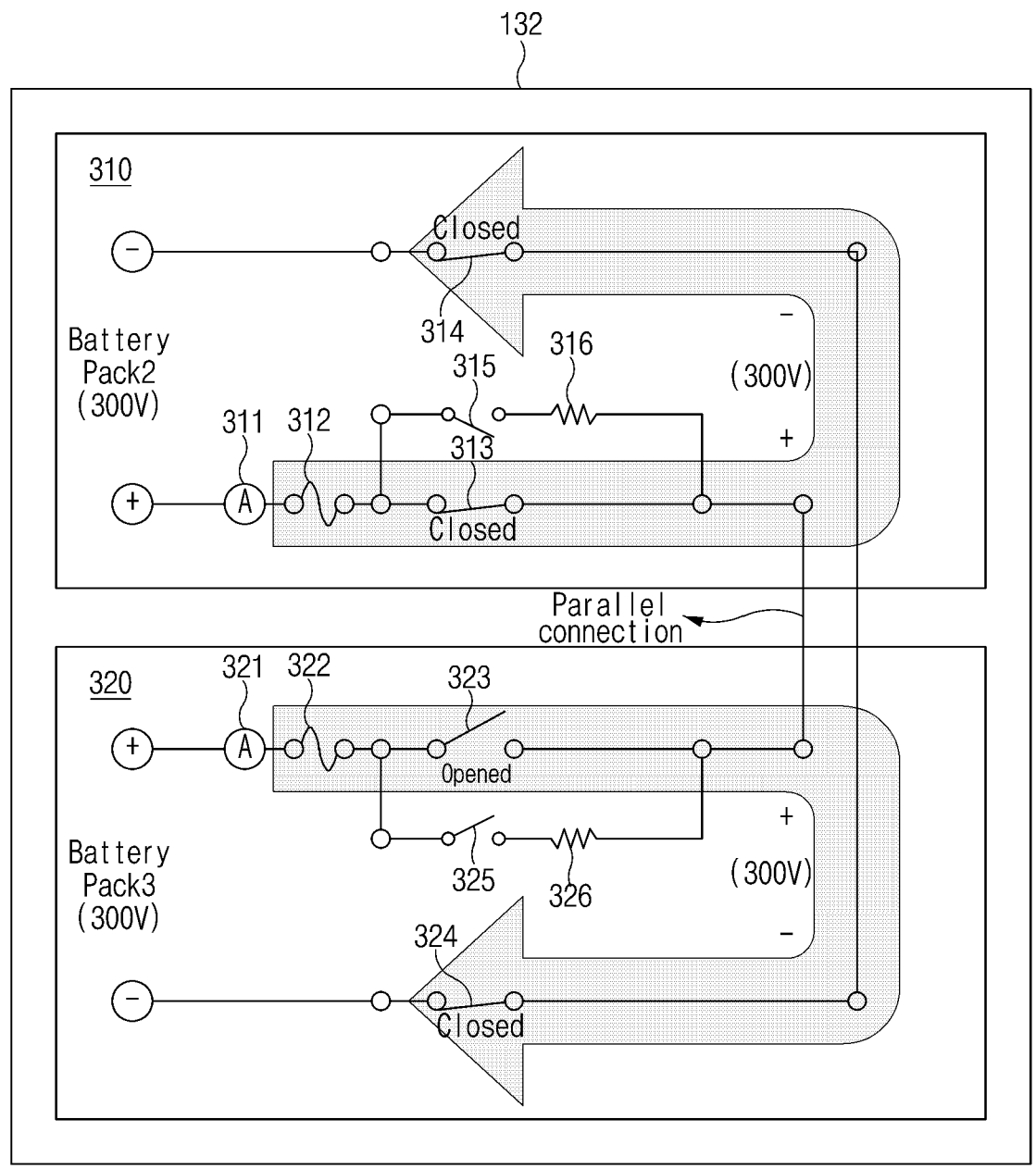
FIG. 8 illustrates a detailed circuit diagram of an example second diagnosis circuit.

FIG. 8 illustrates a detailed circuit diagram of an example second diagnosis circuit 132.

Referring to FIG. 8, the second diagnosis circuit 132 may include a circuit 310 connected to the second battery pack 22 and a circuit 320 connected to the third battery pack 23.

The circuit 310 may include a current sensor 311, a fuse 312, main relays 313 and 314, a precharge relay 315, and a precharge resistor 316. The circuit 320 may include a current sensor 321, a fuse 322, main relays 323 and 324, a precharge relay 325, and a precharge resistor 326. Since the circuit 310 and the circuit 320 have a same configuration and operation, only the detailed configuration and operation of the circuit 310 will be described, and the description of the detailed configuration and operation of the circuit 320 will be omitted.

A first side of the current sensor 311 may be connected to an anode (+) terminal of the second battery pack 22, and a first side of the main relay 314 may be connected to a cathode (−) terminal of the second battery pack 22. A second side of the current sensor 311 may be connected to a first side of the fuse 312, the main relay 313 and the precharge relay 315 are connected in parallel, and the precharge resistor 316 may be connected in series with the precharge relay 315. A first side of the main relay 313 and a first side of the precharge relay 315 may be commonly connected to a second side of the fuse 312. A second side of the precharge resistor 316 and a second side of the main relay 313 may be commonly connected, and may be connected to the circuit 320 connected to the second battery pack 22. In addition, a second side of the main relay 314 may be connected to the main relay 324 of the circuit 320, and a line connected to the anode (+) terminal of the battery pack and a line connected to the cathode (−) terminal of the battery pack are connected in parallel, which is called a DC link. Conventionally, a difference between the voltage of the battery pack and a voltage of the DC link has been used to determine whether the relay is opened or closed, but since the diagnosis circuit 132 is connected to both the second battery pack 22 and the third battery pack 23, even when the relay of the diagnosis circuit connected to the second battery pack 22 is opened, if the relay of the diagnosis circuit connected to the third battery pack 23 is closed, a voltage may be applied to the DC link, and thus it was not possible to determine whether the relay was opened or closed by using only the difference between the voltage of the battery pack and the voltage of the DC link. Accordingly, in an exemplary embodiment of the present disclosure, whether the relay is opened or closed is determined by measuring currents flowing through the circuits 310 and 320 and determining whether measured current values are greater than or equal to a predetermined threshold value. In this case, the relay may include the main relays 313 and 314 and the precharge relay 315.

In the circuit 310, if a current starts to flow from an anode (+) terminal of the second battery pack 22, a current may flow in a direction of the main relay 312 through the current sensor 311, the fuse 312, the main relay 313 or the precharge relay 315. In this case, if both the main relay 313 and the precharge relay 315 are opened or the main relay 314 is opened, no current may flow.

Even in the case of the circuit 320, if both the main relay 323 and the precharge relay 325 are opened or the main relay 324 is opened, no current may flow.

Figure 9:
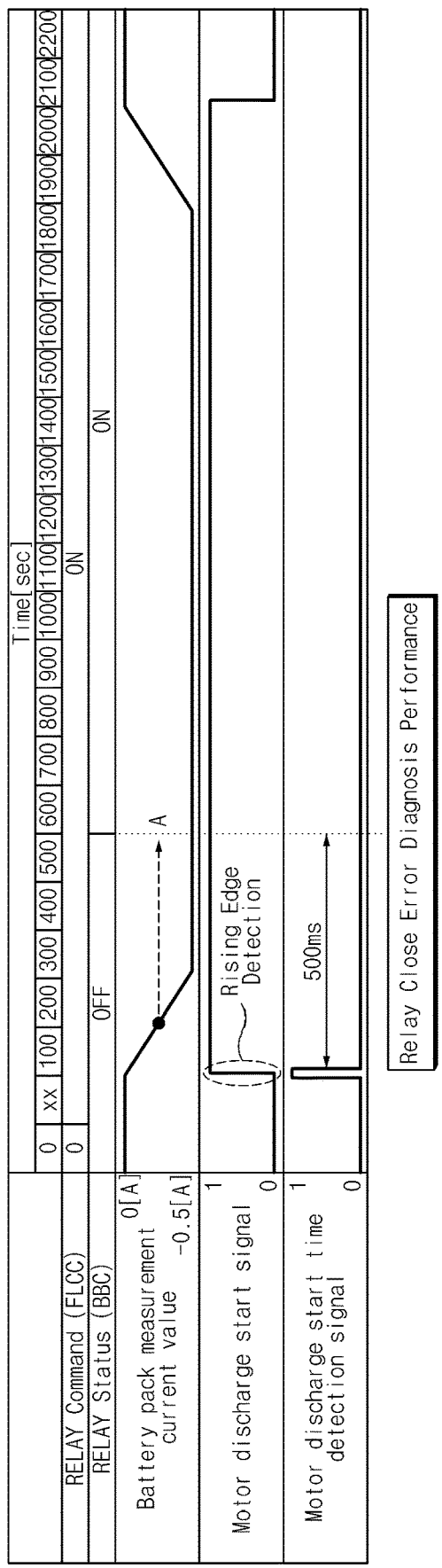
FIG. 9 illustrates an example diagnosis sequence.

FIG. 9 illustrates an example diagnosis sequence.

Referring to FIG. 9, a relay control command (RELAY command), a relay status signal (RELAY Status), a battery pack measurement current value, a motor discharge start signal, and a motor discharge start time detection signal outputted by the flight control apparatus 110 are illustrated.

If the relay control command is activated by the flight control apparatus 110 and the motor discharge start signal is activated from the flight control apparatus 110, the battery control apparatus 120 may detect a rising edge of the motor discharge signal (e.g., motor discharge start time point). If the rising edge of the motor discharge start signal is detected, the battery control apparatus 120 may transmit a command to the battery pack diagnosis control apparatuses 141, 142, and 143 to start the diagnosis.

One or more of the battery pack diagnosis control apparatuses 141, 142, and 143 may detect a current of the battery pack for a predetermined time (e.g., 500 ms) after detecting the rising edge of the motor discharge start signal, and the flight control apparatus 110 may determine that flight preparation is completed in a state in which the relay is normally closed because the current normally flows if the measured current value is greater than a predetermined threshold value A.

If the motor discharge start signal is converted from 0 to 1 and the rising edge of the motor discharge start signal is checked, one or more of the battery pack diagnosis control apparatuses 141, 142, and 143 may measure the current for a certain period (e.g. 500 ms). If the current measured for the certain period exceeds a threshold value, one or more of the battery pack diagnosis control apparatuses 141, 142, and 143 may determine that the relay of the battery pack is normally operated (closed). If the current measured for the certain period does not exceed the threshold value A, one or more of the battery pack diagnosis control apparatuses 141, 142, and 143 may determine that the battery pack is out of order by determining that the relay of the battery pack is not normally operated (open).

It may be possible to re-diagnose an opened or closed state of the relay of the battery pack by converting the motor discharge start signal from 0 to 1 before the flying object attempts to take off.

Figure 10:
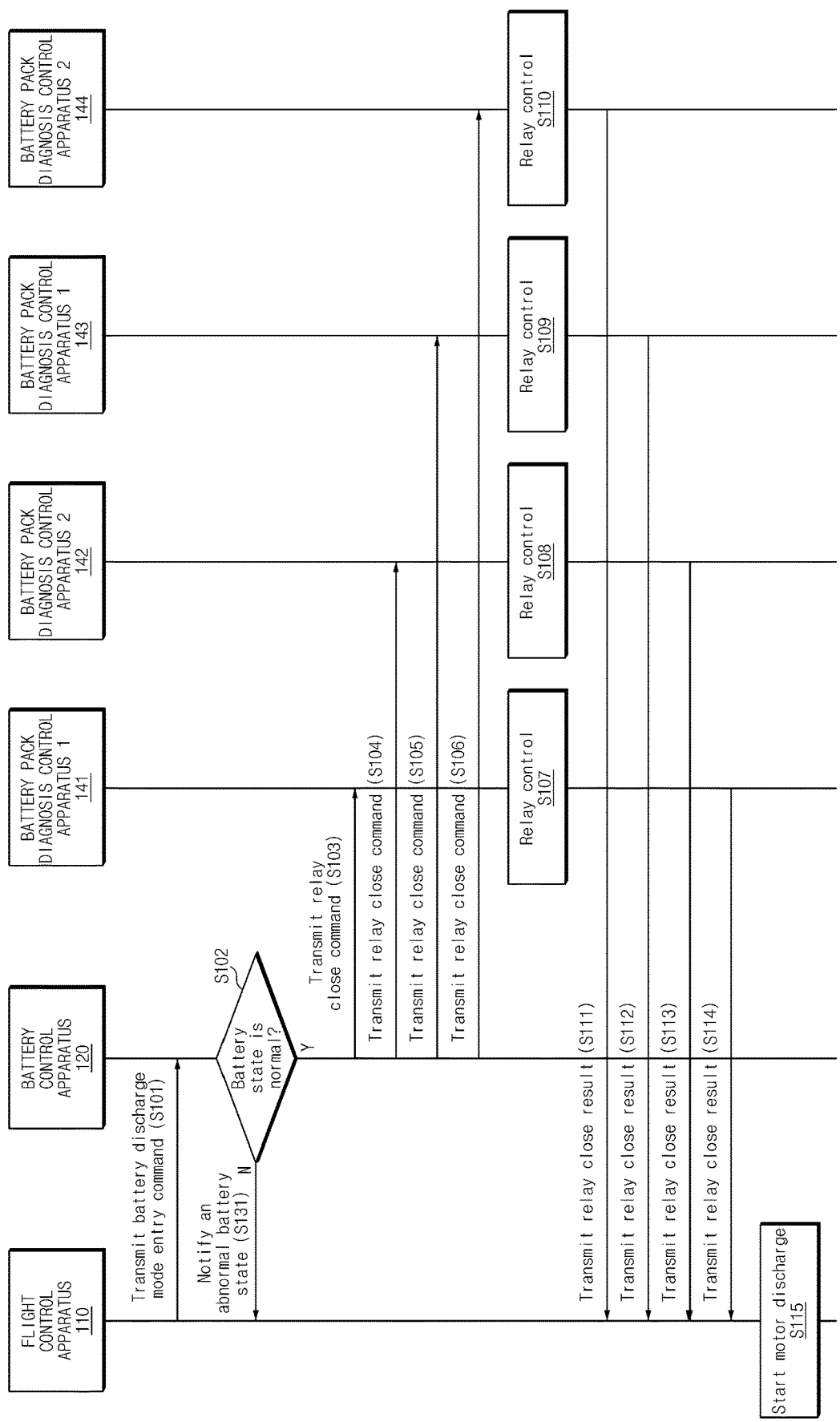
FIG. 10 and FIG. 11 illustrate flowcharts of an example method for diagnosing opening/closing of a high voltage parallel battery pack.
Figure 11:
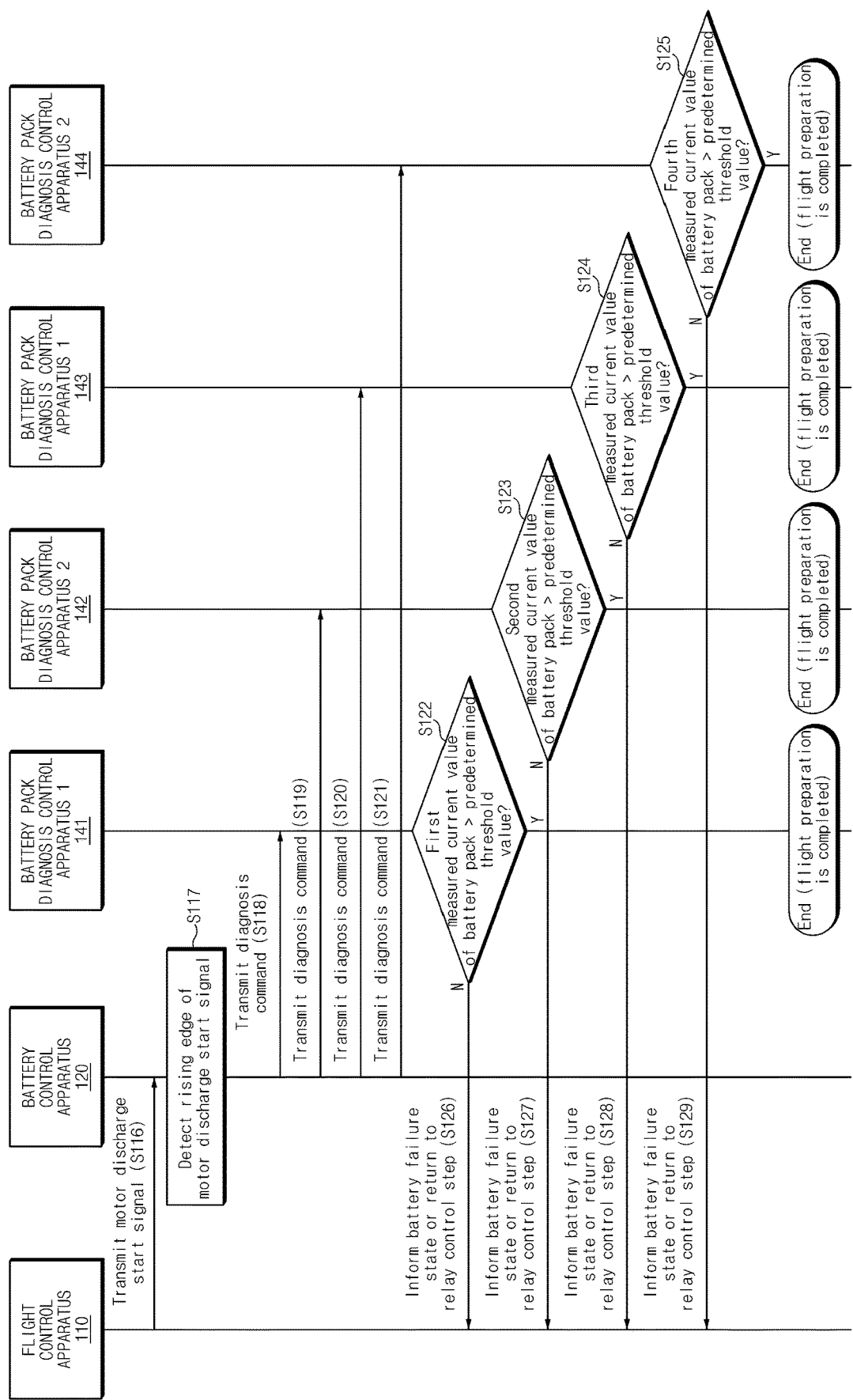

Hereinafter, a method of diagnosing opening/closing of a relay of a battery pack according to an exemplary embodiment of the present disclosure will be described in detail with reference to FIG. 10 and FIG. 11. FIG. 10 and FIG. 11 illustrate flowcharts of an example method for diagnosing opening/closing of a relay of a battery pack.

Hereinafter, it is assumed that the battery system 100 of FIG. 1 performs the processes of FIG. 10 and FIG. 11. In addition, in the description of FIG. 10 and FIG. 11, operations described as being performed by a device may be understood as being controlled by the flight control apparatus 110, the battery control apparatus 120, the battery pack diagnosis control apparatuses 141, 142, 143, and 144 of the battery system 100.

Referring to FIG. 10, the flight control apparatus 110 may transmit a battery discharge mode entry command to the battery control apparatus 120 (S101).

The battery control apparatus 120 may determine whether a battery state is normal (S102). In this case, the battery control apparatus 120 may store an algorithm (e.g., instructions) for determining whether the battery state is normal by itself, and may determine whether the battery state is normal based on the algorithm.

If the battery state is abnormal, the battery control apparatus 120 may notify the flight control apparatus 110 of an abnormal battery state (S131), and the flight control apparatus 110 may notify the battery abnormal state to the ground control apparatus 200. Accordingly, the ground control apparatus 200 may output whether or not there is abnormality in the battery so that a user may check it.

In the meantime, if the battery state is normal, the battery control apparatus 120 may transmit a relay close command for diagnosing opening/closing of the relay of the battery pack to each of the first battery pack diagnosis control apparatus 141, the second battery pack diagnosis control apparatus 142, the third battery pack diagnosis control apparatus 143, and the fourth battery pack diagnosis control apparatus 144 (S103, S104, S105, and S106).

In this case, as illustrated in FIG. 10, the battery control apparatus 120 may transmit the relay close command to each of the battery pack diagnosis control apparatuses 141, 142, 143, and 144, but the present disclosure is not limited thereto, and may sequentially perform relay opening/closing diagnosis by transmitting a close command depending on a predetermined sequence. For example, the battery control apparatus 120 may first perform relay opening/closing diagnosis of the battery pack having a highest voltage among the battery packs 21, 22, 23, and 24, and then may sequentially perform the relay opening/closing diagnosis depending on a voltage order (e.g., descending order of voltage). Conversely, the battery control apparatus 120 may first perform relay opening/closing diagnosis of the battery pack having a lowest voltage among the battery packs 21, 22, 23, and 24, and then may sequentially perform the relay opening/closing diagnosis depending on a voltage order (e.g., ascending order of voltage).

Accordingly, the first battery pack diagnosis control apparatus 141, the second battery pack diagnosis control apparatus 142, the third battery pack diagnosis control apparatus 143, and the fourth battery pack diagnosis control apparatus 144 may close the relays of the diagnosis circuit 131, 132, and 133 (S107, S108, S109, S110).

Subsequently, the first battery pack diagnosis control apparatus 141, the second battery pack diagnosis control apparatus 142, the third battery pack diagnosis control apparatus 143, and the fourth battery pack diagnosis control apparatus 144 may transmit relay close results to the flight control apparatus 110 through the battery control apparatus 120 (S111, S112, S113, S114).

Accordingly, the flight control apparatus 110 may start discharging a motor (S115).

That is, the flight control apparatus 110 may transmit a motor discharge start signal to the battery control apparatus 120 (S116).

The battery control apparatus 120 may detect a rising edge of the motor discharge start signal as illustrated in FIG. 9 (S117). That is, if the rising edge of the motor discharge start signal is detected, the battery control apparatus 120 may transmit a diagnosis command for starting diagnosis to the first battery pack diagnosis control apparatus 141, the second battery pack diagnosis control apparatus 142, the third battery pack diagnosis control apparatus 143, and the fourth battery pack diagnosis control apparatus 144 (S118, S119, S120, and S121).

Accordingly, the first battery pack diagnosis control apparatus 141, the second battery pack diagnosis control apparatus 142, the third battery pack diagnosis control apparatus 143, and the fourth battery pack diagnosis control apparatus 144 may determine whether the measured current value of each battery pack exceeds a predetermined threshold value (S122, S124, S124, and S125). In this case, the threshold value may be determined in advance as an experimental value.

If the measured current value of each battery pack does not exceed the predetermined threshold value, the first battery pack diagnosis control apparatus 141, the second battery pack diagnosis control apparatus 142, the third battery pack diagnosis control apparatus 143, and/or the fourth battery pack diagnosis control apparatus 144 may notify a battery failure state to the flight control apparatus 110 through the battery control apparatus 120, and the process may return to the relay control steps S107, S108, S109, and S110 (S126, S127, S128, and S129). That is, if no current flows even though the motor starts to discharge, the first battery pack diagnosis control apparatus 141, the second battery pack diagnosis control apparatus 142, the third battery pack diagnosis control apparatus 143, and/or the fourth battery pack diagnosis control apparatus 144 may determine that no current flow beyond relay control to diagnose the battery pack as a failure.

If the measured current value of each battery pack exceeds the predetermined threshold value, the first battery pack diagnosis control apparatus 141, the second battery pack diagnosis control apparatus 142, the third battery pack diagnosis control apparatus 143, and/or the fourth battery pack diagnosis control apparatus 144 may determine that the battery pack is in a normal state, and may complete flight preparation.

Figure 12:
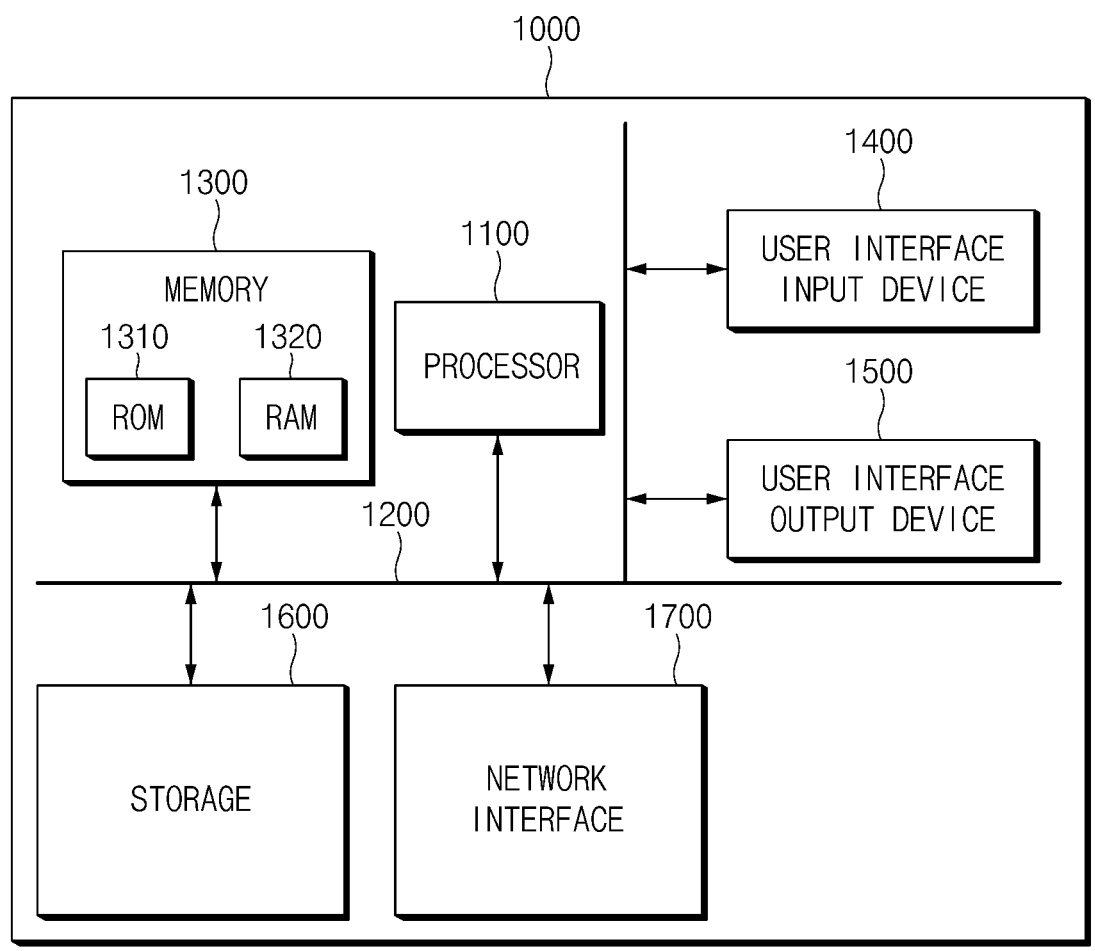
FIG. 12 illustrates an example computing system.

FIG. 12 illustrates a computing system according to an exemplary embodiment of the present disclosure.

Referring to FIG. 12, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A battery system comprising:
   at least one battery pack;
   at least one processor; and
   memory storing instructions that, when executed by the at least one processor, cause the battery system to:
   control a first apparatus, causing the first apparatus to transmit a battery discharge mode command and a motor command;
   control a second apparatus, causing the second apparatus to:
      transmit a relay control command based on receiving the battery discharge mode command; and
      transmit a diagnosis command based on receiving the motor command;
   control at least one third apparatus, causing the third apparatus to:
      control a relay associated with the relay control command and supply a current of a battery pack of the at least one battery pack to a motor based on receiving the relay control command;
      measure the current of the battery pack based on receiving the diagnosis command; and
      determine that the battery pack is in a faulty state based on the measured current not exceeding a predetermined threshold value, and
   control a ground control circuit, causing the ground control circuit to output, based on receiving a notification of a battery pack failure state from the first apparatus, the notification.

2. The battery system of claim 1, further comprising at least one diagnosis circuit, connected to the at least one battery pack, comprising the relay.

3. The battery system of claim 2, wherein the instructions, when executed by the at least one processor, cause the battery system to control the at least one third apparatus, causing the at least one third apparatus to:
   measure the current flowing from the battery pack to a diagnosis circuit of the at least one diagnosis circuit.

4. The battery system of claim 3, wherein the instructions, when executed by the at least one processor, cause the battery system to control the at least one third apparatus, causing the at least one third apparatus to:
   transmit, to the first apparatus, a signal indicating the faulty state.

5. The battery system of claim 1, wherein the instructions, when executed by the at least one processor, cause the battery system to control the at least one third apparatus, causing the at least one third apparatus to:
   control the relay a second time based on the measured current not exceeding the predetermined threshold value.

6. The battery system of claim 2, wherein the at least one diagnosis circuit comprises:
   a current sensor connected to an anode (+) terminal of a first battery pack of the at least one battery pack, wherein the instructions, when executed by the at least one processor, cause the battery system to control the current sensor, causing the current sensor to measure a current flowing from the first battery pack; and
   a first main relay and a second main relay that are opened and closed under control of an apparatus of the at least one third apparatus.

7. The battery system of claim 6, wherein the instructions, when executed by the at least one processor, cause the battery system to control the apparatus of the at least one third apparatus, causing the at least one third apparatus to:
   diagnose whether the first battery pack is out of order by using the current measured by the current sensor, wherein the current is measured by the current sensor after the first main relay and the second main relay are closed by the apparatus of the at least one third apparatus.

8. The battery system of claim 6, wherein the current sensor is a first current sensor, and wherein the at least one diagnosis circuit further comprises:
   a second current sensor connected to an anode (+) terminal of a second battery pack of the at least one battery pack, wherein the instructions, when executed by the at least one processor, cause the battery system to control the second current sensor, causing the second current sensor to measure a current flowing from the second battery pack; and
   a third main relay and a fourth main relay that are opened and closed under control of another apparatus of the at least one third apparatus,
   wherein the first main relay and the third main relay are connected to each other, and
   wherein the second main relay and the fourth main relay are connected to each other.

9. The battery system of claim 1, wherein the motor command comprises a motor signal, and wherein the instructions, when executed by the at least one processor, cause the battery system to control the second apparatus, causing the second apparatus to:
   transmit the diagnosis command based on detecting a rising edge of the motor signal received from the first apparatus.

10. The battery system of claim 1, wherein the instructions, when executed by the at least one processor, cause the battery system to control the at least one third apparatus, causing the at least one third apparatus to:
    transmit a relay control result to the first apparatus via the second apparatus after the at least one third apparatus performs a control operation of the relay.

11. The battery system of claim 1, wherein the instructions, when executed by the at least one processor, cause the battery system to control the first apparatus, causing the first apparatus to transmit the motor command based on receiving a relay control result.

12. A battery apparatus comprising:
    one or more processors; and
    memory storing instructions that, when executed by the one or more processors, cause the battery apparatus to diagnose whether a battery pack is out of order by:
    controlling an apparatus of the battery apparatus, causing the apparatus to:
       transmit a relay control command based on a battery discharge mode command; and
       transmit a diagnosis command based on a motor command;

controlling a diagnosis circuit, causing the diagnosis circuit to:
  control, based on the relay control command, a relay, of the diagnosis circuit connected to the battery pack, in a battery discharge mode and supply a current of the battery pack to a motor;
  measure the current flowing from the battery pack to the diagnosis circuit based on receiving the diagnosis command; and
  determine that the battery pack is in a faulty state based on the measured current not exceeding a predetermined threshold value; and
controlling a ground control circuit, causing the ground control circuit to output, based on receiving a notification of a battery pack failure state from the battery apparatus, the notification.

13. The battery apparatus of claim 12, wherein the instructions, when executed by the one or more processors, cause the battery apparatus to:
  control the relay a second time based on the measured current not exceeding the predetermined threshold value.

14. A method performed by a battery apparatus of a vehicle, the method comprising:
  controlling an apparatus of the battery apparatus, causing the apparatus to:
    transmit a relay control command based on a battery discharge mode command; and
    transmit a diagnosis command based on a motor command;
  controlling a diagnosis circuit of the vehicle, causing the diagnosis circuit to:
    control, based on the relay control command, a relay of the diagnosis circuit and supply a current of a battery pack to a motor, wherein the diagnosis circuit is connected to the battery pack in a battery discharge mode;
    measure, via a current sensor of the vehicle, the current flowing from the battery pack to the diagnosis circuit based on receiving the diagnosis command; and
    determine that the battery pack is in a faulty state based on the measured current not exceeding a predetermined threshold value; and
  controlling a ground control circuit, causing the ground control circuit to output, based on receiving a notification of a battery pack failure state from the battery apparatus, the notification.

15. The method of claim 14, further comprising diagnosing whether the battery pack is out of order by:
  controlling the relay a second time based on the measured current not exceeding the predetermined threshold value.

16. The method of claim 14, further comprising diagnosing whether the battery pack is out of order by:
  determining that the battery pack is in a normal state; and
  completing flight preparation of the vehicle based on the measured current exceeding the predetermined threshold value.

* * * * *